(12) United States Patent
Alon

(10) Patent No.: US 6,449,225 B1
(45) Date of Patent: Sep. 10, 2002

(54) METHOD AND APPARATUS FOR READING MULTIPLE TRACKS OF AN OPTICAL DISK

(75) Inventor: Amir Alon, Sunnyvale, CA (US)

(73) Assignee: Zen Research (Ireland), Ltd., Dublin (IE)

(*) Notice: Subject to any disclaimer, the term of this patent is extended or adjusted under 35 U.S.C. 154(b) by 0 days.

(21) Appl. No.: 09/373,683

(22) Filed: Aug. 13, 1999

(51) Int. Cl.⁷ .................................................. G11B 7/00
(52) U.S. Cl. .............................. 369/44.17; 369/44.37; 369/47.16; 369/112.01
(58) Field of Search ........................... 369/44.11, 44.12, 369/44.14, 44.17, 44.18, 44.19, 44.28, 44.37, 112.01, 112.03, 112.04, 112.05, 119, 47.1, 47.15, 47.16

(56) References Cited

U.S. PATENT DOCUMENTS

| | | |
|---|---|---|
| 4,769,800 A | 9/1988 | Moser et al. |
| 4,969,137 A | 11/1990 | Sugiyama et al. |
| 5,153,870 A | 10/1992 | Lee et al. |
| 5,828,644 A | 10/1998 | Gage et al. ................. 369/112 |
| 6,052,357 A | 4/2000 | Ogawa et al. ............... 369/215 |
| 6,243,350 B1 * | 6/2001 | Knight et al. ........ 369/44.23 X |

FOREIGN PATENT DOCUMENTS

| | | |
|---|---|---|
| EP | 0 323 845 | 7/1989 |
| JP | 59132432 | 7/1984 |
| JP | 2158931 | 6/1990 |
| JP | 5081684 | 4/1993 |
| JP | 5159348 | 6/1993 |
| JP | 5159349 | 6/1993 |
| WO | WO 99/09552 | 2/1999 |

* cited by examiner

Primary Examiner—Muhammad Edun
(74) Attorney, Agent, or Firm—Fish & Neave; Nicola A. Pisano; Michael J. DeHaemer, Jr.

(57) ABSTRACT

A multi-track optical disk reader is provided having an optical pickup including multiple reading beams arranged in a pattern, such that each beam is directed towards a track to be read. The optical pickup is at least partly mounted on a swing-arm mechanism that orients the reading beam pattern with respect to the tracks being read. Methods and apparatus are provided for maintaining a desired position of the reading beams with respect to the tracks on an optical disk.

22 Claims, 5 Drawing Sheets

METHOD AND APPARATUS FOR READING MULTIPLE TRACKS OF AN OPTICAL DISK

FIELD OF THE INVENTION

The present invention relates to methods and apparatus for simultaneously reading multiple tracks of an optical disk, and more specifically to methods and apparatus for use with a swing-arm type optical pickup.

BACKGROUND OF THE INVENTION

Due to their high storage density, long data retention life, and relatively low cost, optical disks have become the predominant media format for distributing information. For example, the compact disk (CD) format, developed and marketed for the distribution of musical recordings, has replaced vinyl records. Similarly, high-capacity, read-only data storage media, such as CD-ROM have become prevalent in the personal computer field for the distribution of software and databases. And the DVD format may soon replace videotape as the distribution medium of choice for video information.

Physically, the information bearing portion of an optical disk consists of a series of pits, or bumps, arranged to form a spiral track. Data is encoded in the length of individual pits and the length of the space between pits. An optical pickup assembly reads the data by reflecting a laser beam off of the optical disk. Because the disk is rotated, the laser beam alternately reflects from the pits and the spacing between the pits. This causes discernable changes in the reflected laser beam which are detected and decoded to recover data stored on the optical disk.

As used herein, data track refers to a portion of the spiral data track corresponding to a single rotation of an optical disk. A drive capable of reading multiple data tracks simultaneously reads multiple such portions of the spiral track at once. For disks having multiple concentric spiral tracks, data track refers to one revolution of one of the concentric spiral tracks. For optical disks having concentric circular tracks, data track refers to one such circular track.

U.S. Pat. No. 5,793,549 to Alon et al., describes as optical disk reader that reads multiple data tracks simultaneously, for example, using multiple laser beams. The multiple laser beams, which may be obtained by splitting a single beam using a diffraction grating or by providing multiple laser sources, are focused on and aligned with corresponding tracks of the optical disk. The reflected beams are then detected and decoded. Thus, a disk rotated at 6× the standard speed in a disk drive reading ten tracks at a time provides a data rate equivalent to a 60× single beam drive, but without the complications associated with high rotational speeds.

In addition to being aligned with the data tracks, the beams in a multi-beam optical pickup must be maintained at specified distances from each other to avoid crosstalk and to properly align the beams with the detectors. These distances are determined by the spacing of the tracks, i.e., the track pitch, the magnification of the optics, and the size and spacing of the detectors used to read the information. Typically, the minimum spacing is greater than the track pitch, requiring the multiple laser beams to be spaced circumferentially as well as radially with respect to the optical disk.

The necessary spacing between beams may be decreased either by increasing the magnification of the optics or by decreasing the size and spacing of the detectors as described in allowed U.S. patent application Ser. No. 09/042,185, "METHODS AND APPARATUS FOR PERFORMING CROSS-TALK CORRECTION IN A MULTI-TRACK OPTICAL DISK READER BASED ON MAGNIFICATION ERROR" now U.S. Pat. No. 5959953. Increasing the magnification of the optics reduces the optical efficiency of the system, and reducing the size of the detectors reduces efficiency and increases manufacturing cost. The spacing of the beams in a multi-beam system represents a tradeoff between these factors. When the size, sensitivity, and cost of photo detectors improve, it may be possible to reduce the spacing between the beams.

An exemplary multi-beam optical disk reader is described in commonly-assigned U.S. patent application Ser. No. 08/911,815, entitled "INTEGRATED MULTI-BEAM PICKUP ASSEMBLY," which is incorporated herein by reference. The optical disk reader described therein includes a plurality of reading beams arranged in a single row. Co-pending, commonly-assigned U.S. patent application Ser. No. 08/912,881, entitled "MULTI-BEAM OPTICAL PICKUP ASSEMBLY AND METHODS USING A COMPACT TWO-DIMENSIONAL ARRANGEMENT OF BEAMS," which is incorporated herein by reference, describes an optical disk reader including a plurality of reading beams arranged in a two dimensional pattern. To maintain the needed distances between spots projected onto the surface of the disk as determined by the beam spacing, the pattern of laser beam spots must have a specific orientation with respect to the radial direction of the disk.

To read different portions of an optical disk a mechanism is provided for positioning the optical pickup adjacent to the portion to be read. Swing arm, rack-and-pinion, screw drive, and linear motor systems for positioning the optical pickup are known in the art, and described, for example, in *Compact Disk Technology*, Nakajima, H. and Ogawa, H., translated by Aschmann, C., Ohmsha, Ltd., Japan, 1992, and *The Compact Disk Handbook*, Pohlmann, K., 2nd. Ed., A-R Editions, 1992.

Selection of a positioning mechanism involves tradeoffs between access speed, design complexity, and manufacturing expense. For example, rack-and-pinion and screw drives are relatively slow at positioning the optical pickup. However, because they are also inexpensive and robust, they are often used in consumer level applications. By comparison, linear motors provide faster positioning, but are complex and more expensive than rack-and-pinion mechanisms. A swing-arm type positioning mechanism, such as that shown in U.S. Pat. No. 5,828,644, provides rapid positioning and is less complex than a linear motor systems.

While it would be desirable to use a pivoting arm such as described in the foregoing patent, several drawbacks arise from attempting to use such technology in a multi-beam optical disk reader. For example, in an optical disk reader that uses multiple laser beams, the orientation of laser beam spot pattern would change when the swing-arm pivots. Consequently, the laser beam spots may not align with the respective tracks at some radial positions of the optical pickup. This effect may increase the number of read errors or reduce the number of tracks that may be read simultaneously.

It would therefore be desirable to provide methods and apparatus for keeping multiple reading beams aligned with respective tracks of an optical disk when employing a swing-arm mechanism for positioning an optical pickup.

SUMMARY OF THE INVENTION

In view of the foregoing it is an object of the present invention to provide methods and apparatus that keep multiple reading beams aligned with respective tracks of an optical disk when employing a swing-arm mechanism for positioning an optical pickup.

These and other objects of the present invention are achieved by providing methods and apparatus for compensating for the rotation of the laser beam pattern projected onto an optical disk caused by motion of a swing-arm. In a first embodiment, when the swing-arm is pivoted, the laser beam spot pattern is pivoted, or rotated, in an opposite direction to offset rotation caused by motion of the swing-arm. In a second embodiment, the swing-arm and optical pickup are constructed so that the orientation of the laser beam spot pattern does not change when the swing-arm is pivoted. And in a third embodiment, the spacing between the laser beams spots is adjusted to compensate for the rotation of the line of laser beam pattern.

BRIEF DESCRIPTION OF THE DRAWINGS

The above and other objects and advantages of the present invention will be apparent upon consideration of the following detailed description taken in conjunction with the accompanying drawings, in which like characters refer to like parts throughout, and in which.

DETAILED DESCRIPTION OF THE INVENTION

Figure 1:
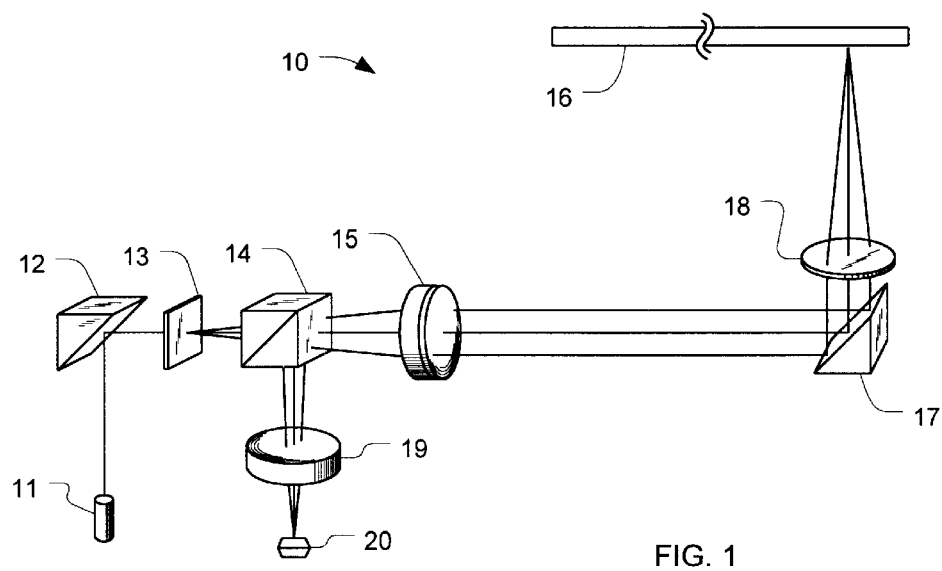
FIG. 1 is a simplified schematic representation of a multi-beam optical pickup suitable for use in practicing the present invention.

Referring to FIG. 1, a simplified diagram of illustrative multi-beam optical pickup 10, suitable for use in the present invention, is described. Individual components of optical pickup assembly 10 may comprise elements used in previously known optical disk readers. Light from light source 11, typically a laser diode, is directed by prism mirror 12 to grating 13 which splits the light into multiple beams. The multiple beams pass through beam splitter 14, are collimated by lens 15 and directed to optical disk 16 by prism mirror 17. Objective lens 18 is adjusted by a servo mechanism to keep the light beams focused on the surface of optical disk 16.

Optical disk 16 contains a reflective layer in which the data is recorded. Typically the data is recorded in the form of pits (or bumps) in the reflective layer. Alternatively, some recordable optical disks use physical or chemical properties of the reflective layer material, such as its magnetic properties, or its ability to polarize incident light, to record the data.

The light beams focused on optical disk 16 are reflected by the reflective layer and modulated by the data recorded therein. The reflected light travels back through objective lens 18 and is reflected by prism mirror 17 to collimator 15. The reflected light beams are then directed toward optical sensor 20 by beam splitter 14. Lens 19 may be provided to further focus the reflected light beams onto optical sensor 20.

Optical sensor 20 provides electrical signals corresponding to the light beams impinging thereon. Processing circuitry, as described, for example, in commonly owned U.S. Pat. No. 5,627,805, decodes and processes the electrical signals to recover the data recorded on the optical disk. Additional circuitry converts the data to a format suitable for use by a computer or other processing device, and acts as an interface between the optical disk reader and computer or other processing device.

Diffraction grating 13 also may comprise a hologram, and fiber optic wave guides may be used in place of one or more of mirrors 12 and 17, as well as lenses 15, 18, and 19. Beam splitter 14 may comprise a half-silvered mirror or a polarizing beam splitter. In addition, one or both of prism mirrors 12 and 17 may be omitted by changing the physical arrangement of the optical components.

The multiple laser beams are used to simultaneously read multiple tracks of an optical disk. When projected onto an optical disk, the laser beam spots are arranged in a specific pattern, such as a line or array of spots, to ensure each laser spot illuminates the correct track. If a swing-arm type of mechanism is used to position an optical pickup assembly, however, the angular orientation of the laser beam spot pattern changes as the swing-arm pivots to read different portions of an optical disk.

Figure 2:
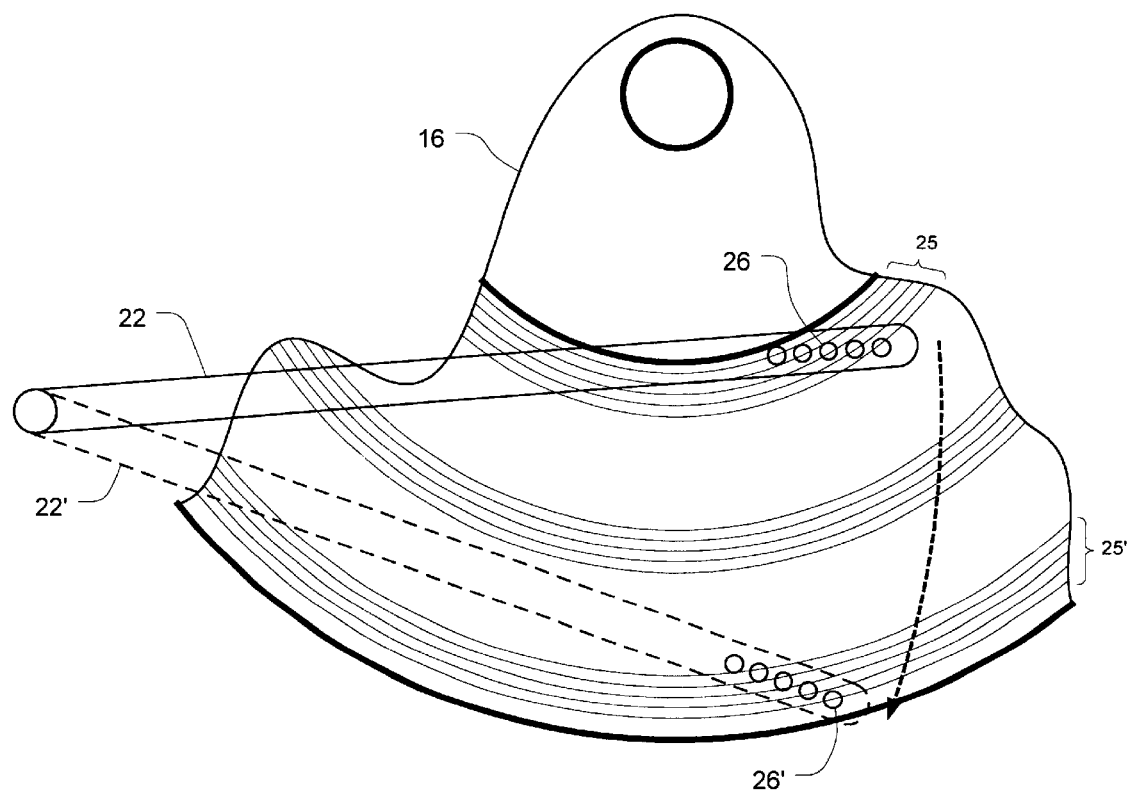
FIG. 2 is a plan view of a swing-arm mechanism positioned adjacent to a portion of an optical disk.

For example, in FIG. 2, swing-arm 22 is positioned near an inner circumference of optical disk 16, so that laser beam spots 26 are focused on, and aligned with, corresponding ones of tracks 25. When swing-arm 22 is moved to read tracks near the outer circumference of optical disk 16, as indicated by phantom pickup arm 22', the orientation of laser beam spots 26' with respect to optical disk 16 changes so that the laser beam spots are no longer aligned with tracks 25'. This may in turn affect the number of tracks the optical disk reader is able to accurately read simultaneously.

One method of compensating for the change in angular orientation of the laser beam spot pattern is to rotate, or pivot, the array of laser beam spots in a direction opposite to the rotation of the swing-arm. Illustrative compensation mechanisms are shown, for example, by optical pickups 30 and 31 of FIGS. 3A and 3B, respectively.

Figure 3A:
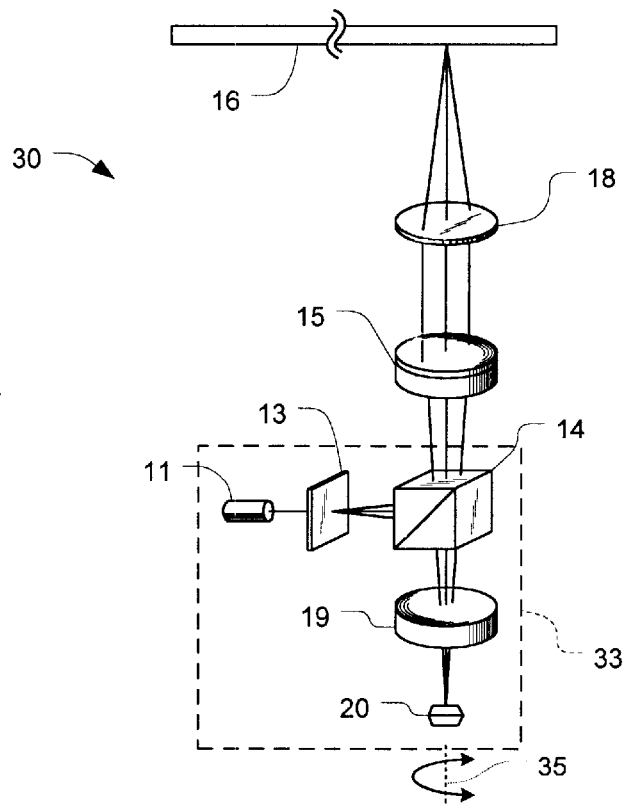
FIGS. 3A through 3C are, respectively, simplified illustrative embodiments of optical pickups constructed in accordance with the principles of the present invention.

Optical pickup 30 of FIG. 3A generally includes the same optical components as optical pickup 10 of FIG. 1. It differs from optical pickup 10 in that it is primarily oriented perpendicular to the surface of optical disk 16. Some of the components of optical pickup are mounted to form assembly 33. At a minimum, laser 11, grating 13, beam splitter 14, lens 19, and detector 20 are mounted on assembly 33. Collimator 15 and objective lens 18 may also be mounted on assembly 33 if desired.

Assembly 33 is mounted on the end of swing-arm 22 of FIG. 2, in such a way that assembly 33 rotates about axis 35, shown in FIG. 3A. Preferably, axis 35 is aligned with the optical axis of objective lens 18. Rotation of assembly 33 about axis 35 changes the angular orientation of the laser beam spot pattern relative to the radius of optical disk 16, thereby enabling the optical disk reader to maintain the laser beam spots in alignment with the corresponding tracks of optical disk 16.

To fully compensate for the motion of swing-arm 22, assembly 33 should be rotated through the same angle as swing-arm 22, but in an opposite direction. For example, in FIG. 2, swing-arm 22 is rotated clockwise through an angle of approximately 25 degrees in moving from position 22 to position 22'. To compensate, assembly 33 of FIG. 3 is rotated approximately 25 degrees in a counter-clockwise direction.

The proper rotation of assembly 33 required to compensate for movement of swing-arm 22 may be specified statically, or determined dynamically. In a statically compensated system, a look up table is created containing the proper rotation of assembly 33 needed to compensate for various angular positions of swing-arm 22. In using such a system, an optical disk reader obtains the angular position of swing-arm 22 directly through a position sensing device, such as a shaft encoder, or indirectly from the number of a track being read, i.e. a block number. The position of swing-arm 22 is then used as an-entry into the lookup table to find the required rotation of assembly 33 to provide the required compensation.

Figure 4:
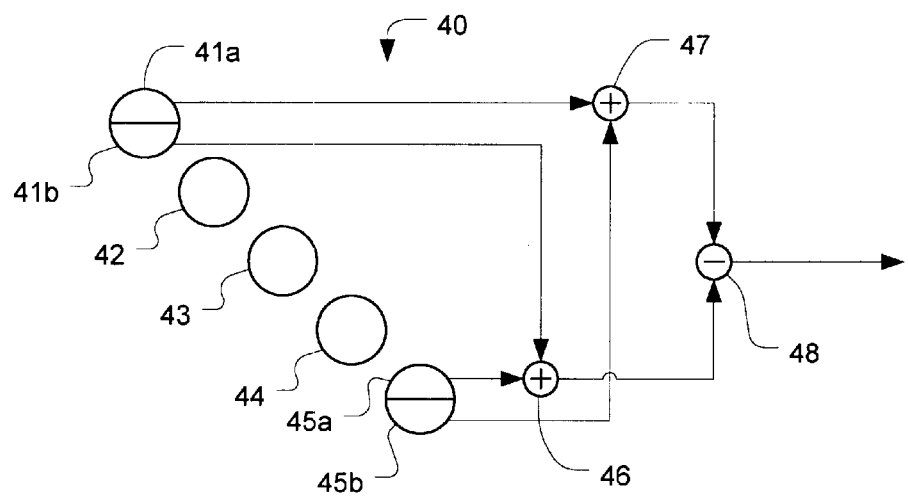
FIG. 4 is a schematic of illustrative circuitry for providing a rotation error signal in accordance with the principles of the present invention.

In a dynamically determined system, a servo system is used to continuously and automatically adjust the rotation of assembly 33 to compensate for the angular position of swing-arm 22. With respect to FIG. 4, circuitry for providing a rotational error signal, is described. Optical pickup 20 includes an array of sensors 41–45, including one sensor for each track to be read from the optical disk. Each sensor is electronically biased so that it outputs a signal proportional to the intensity of the reflected laser beams incident thereon. The output of each sensor is processed to recover the data stored in the corresponding tracks. In addition, the outputs of sensors 41 and 45, which are split into halves, 41a and 41b, and 45a and 45b, respectively, are used to provide a rotational error signal. Although not shown in FIG. 4, other sensors may be split to provide tracking and focus error signals as is known in the art.

Circuitry 40, comprising summing circuits 46–47 and difference circuit 48, uses signals from sensors 41 and 45 to calculate error signals indicative of rotational errors. In particular, the output of sensor 41a is summed with the output of sensor 45b, and the output of sensor 41b is summed with that of sensor 45a. In the absence of a rotational error, each half of sensors 41 and 45 receive approximately equal illumination and no rotation error signal is provided. That is the illumination on sensor 41a is approximately equal to that on sensor 41b, and the illumination on sensor 45a is approximately equal to that on 45b, the output signals provided by summing circuits 46 and 47 are substantially the same, and the output of difference circuitry 48 is nearly zero.

However, in the presence of a rotational error, the outputs of the halves of sensors 41 and 45 are unequal. For example, in FIG. 2, the leftmost sensor on phantom swing-arm 22' is misaligned with the corresponding track, causing the signal provided by sensor 41a to differ from the signal provided by sensor 41b. However, the rightmost sensor is aligned with its corresponding track, so that the signals from sensors 45a and 45b are substantially the same.

Thus, the output of summing circuitry 46 (i.e., 41b+45a) differs from the output of summing circuitry 47 (i.e., 41a+45b) and difference circuitry 48 provides a signal indicative of the rotational error. Although not shown in FIG. 4, the rotational error signal is preferably low-pass filtered to remove unwanted high frequency components and provide a more stable error signal. The filtered error signal then may be used by a servo system to rotate assembly 33 to compensate for any rotational error.

Figure 3B:
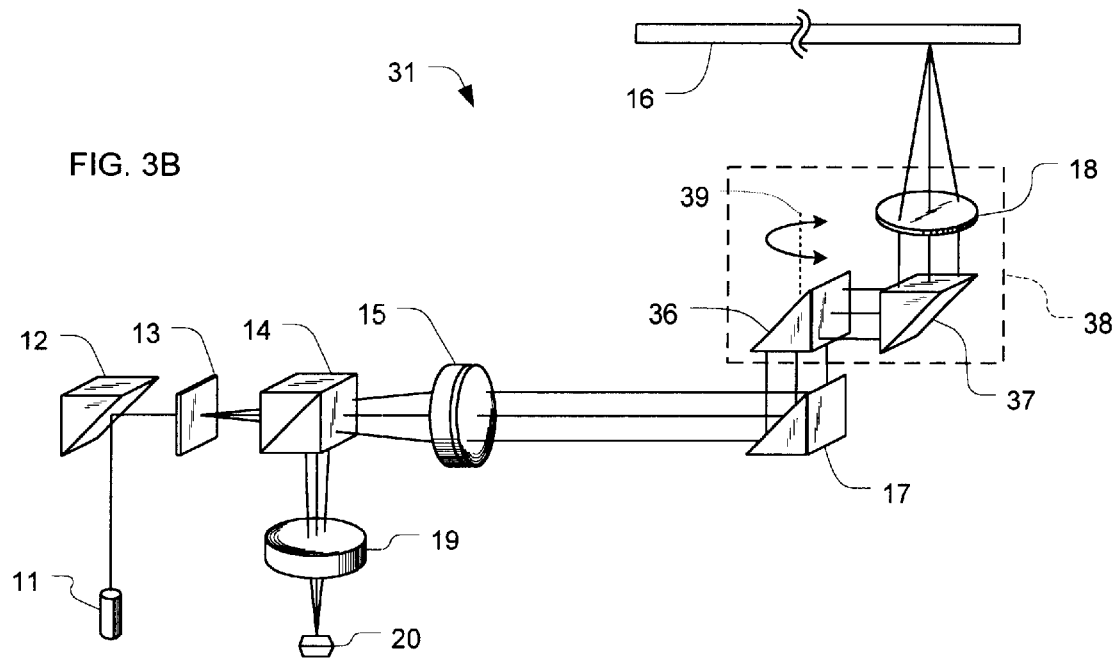

Referring now to FIG. 3B, optical pickup 31 includes prism mirrors 36 and 37 arranged to form a periscope. Prism mirrors 36 and 37, together with objective lens 18, are mounted on a structure to form objective assembly 38. Objective assembly 38 is mounted on swing-arm 22 so that objective assembly 38 may be rotated, or pivoted, about axis 39 to keep the laser beam spots aligned with the tracks being read.

To reduce any radial movement of the laser beam spot pattern associated with rotation of objective assembly 38, an optical axis of objective lens 18 and axis 39 are preferably close together,. Small radial motions of the laser beam spot pattern appear to the optical disk reader control circuitry as a tracking error, and are compensated for by the tracking system.

Optical pickups 30 (FIG. 3A) and 31 (FIG. 3B) compensate for rotational errors caused by movement of the swing-arm by rotating the laser beam spot pattern. Alternatively, the swing-arm and optical pickup may be configured so that the orientation of the laser beam spot pattern does not change due to movement of the swing-arm. One such configuration is described with respect to optical pickup 32 of FIG. 3C.

Figure 3C:
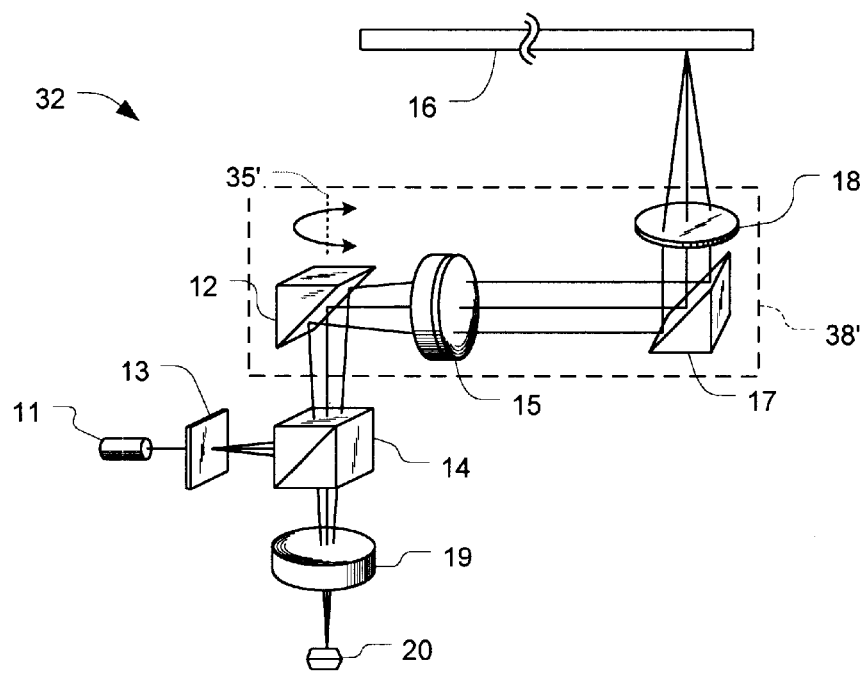

In FIG. 3C, prism mirror 17 and objective lens 18 are disposed at the end of swing-arm 22, and prism mirror 12 is disposed at the pivot point of swing-arm 22, such that prism mirror 12 rotates with swing-arm 22 about axis 35'. Prism mirrors 12 and 17, collimator lens 15, and objective lens 18 make up objective assembly 38'. Together, prism mirrors 12 and 17 form a periscope for directing laser beams to and from the surface of optical disk 16. Collimator lens 15 may be located either between prism mirrors 12 and 17, or between beam splitter 14 and prism mirror 12.

Laser 11, grating 13, beam splitter 14, lens 19, and sensor 20 are not mounted on swing-arm 22, and, therefore, do not pivot or rotate as swing-arm 22 is pivoted to access different portions of optical disk 16. Because these components are not mounted on the swing-arm, the angular orientation of the laser beam spot pattern does not change as the swing-arm 22 is rotated.

Figure 5:
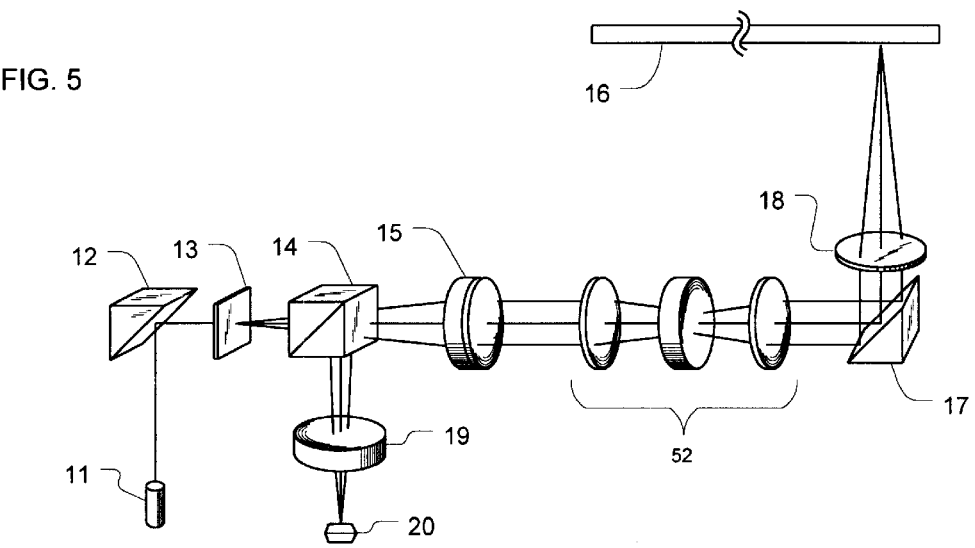
FIG. 5 is a simplified representation of another illustrative embodiment of an optical pickup in accordance with the principles of the present invention.

In a fourth embodiment of the apparatus of the present invention, the optical power, or magnification, of optical pickup 10 of FIG. 1 is adjusted to compensate for rotational errors. Referring again to FIG. 2, the span of laser beams spots 26' is greater than the span of corresponding tracks 25'. One means of reducing the span of laser beam spots 26' is to adjust the magnification of the optical system, thereby changing the spacing between the laser beams spots. FIG. 5 depicts an illustrative arrangement of optical components for providing a variable power optical system.

Optical pickup 50 of FIG. 5 is similar to optical pickup 10 of FIG. 1 and includes the same optical components described with respect to FIG. 1. However, optical pickup 50 includes an additional group of optical components 52 that provides a variable power, or magnification, system. Many different optical components may be used to provide a variable power optical system, several of which are described below in connection with FIGS. 6–9.

Figure 6:
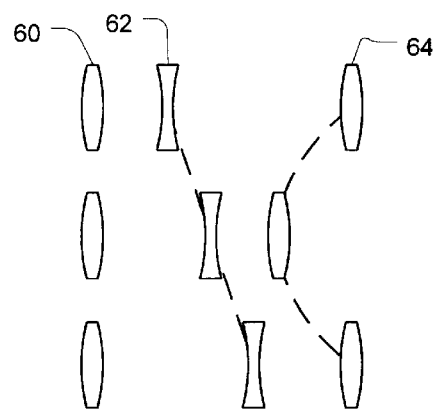
FIGS. 6–10 depict various alternative means for adjusting spacing between the multiple laser beams in the pickup assembly of FIG. 5.

Optical components 52 of FIG. 5 may include a group of three lenses as shown in FIG. 6. Lens 60 is stationary, while lens 62 is moved axially to vary the power of the optical system. Because altering the spacing between lenses 60 and 62 also causes a shift in the image plane of the optical system, lens 64 is moved to counteract the image plane shift. As indicated by the dotted lines in FIG. 6, the correct position of lens 64 is a nonlinear function of the position of lens 62, which may be empirically determined.

Figure 7A:
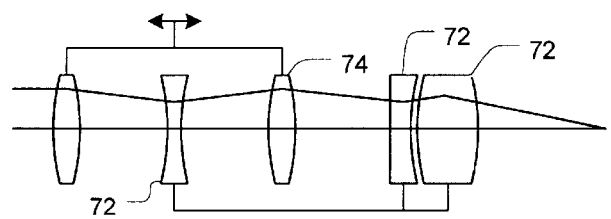
Figure 7B:
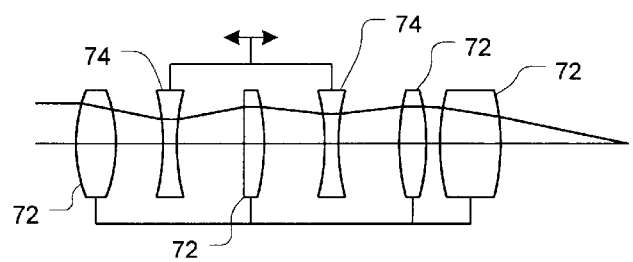

Two alternative variable power optical systems are described with respect to FIGS. 7A and 7B, wherein optical components 52 of FIG. 5 include a number of fixed lenses 72 and movable lenses 74. Movable lenses 74 are linked together so that they move in unison to vary the power of the optical system. Some shifting of the image plane may occur as the power is varied, but over small ranges of power change, the image plane shift is small. Additional groups of lenses may be added to further reduce image plane shift.

Figure 8A:
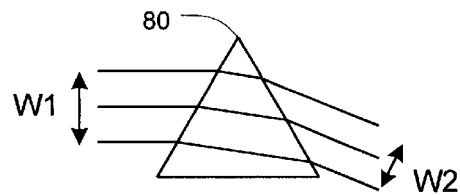
Figure 8B:
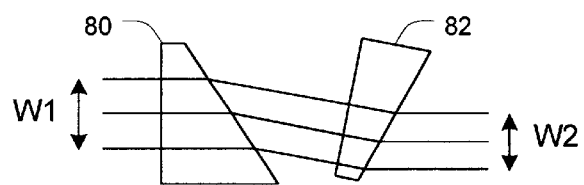

Yet another embodiment of a rotational error correction mechanism of the present invention is shown in FIGS. 8A and 8B. As shown in FIG. 8A, prism 80 may be used as an anamorphic lens. When inserted into the optical path between collimator 15 and prism mirror 17 of FIG. 5, prism 80 magnifies the laser beam spot pattern in a single dimension. For example, reducing the width of the laser beam spot pattern from $w_1$ to $w_2$. The power of prism 80 is determined by the angle of its faces with respect to the optical path, so optical power may be varied by rotating prism 80 about a line parallel to its axis, thereby compensating for the rotational errors.

Prism 80 also causes an angular deviation of the incident laser beams. The amount of the deviation is a function of the angle of the prism faces with respect to the light beam. As illustrated in FIG. 8B, second prism 82 may be used to eliminate or reduce the angular deviation. Thus, by suitably rotating prism 82 the angular deviation introduced by prism 80 may be counteracted.

It should be noted that the laser beams exiting prism 82 have a lateral offset relative to the light beams entering prism 80. Small offsets may appear as a tracking error which will be compensated for by the optical disk reader's tracking subsystem. Alternatively, a glass plate may be used to remove the lateral offset. Further details and designs of variable power systems using lenses and/or prisms may be found in Chapter 9 of *Modern Optical Engineering,* Warren J. Smith, McGraw-Hill Book Company, New York, 1966, which is incorporated herein by this reference.

Figure 9:
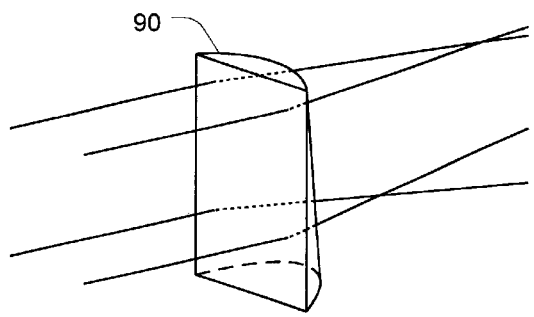

In a further exemplary embodiment of a variable power anamorphic optical system, cylindrical lens 90 may be used wherein the radius of curvature of the lens varies along a length of the lens as shown in FIG. 9. Cylindrical lens 90 is positioned in the optical path such that its flat face is orthogonal to the optical path and its axis is perpendicular to the plane formed by the multiple laser beams. As with the prisms of FIGS. 8A and 8B, a cylindrical lens provides magnification in only a single dimension, wherein the degree of magnification in that dimension is determined by the radius of the curved surface of the lens. By using a lens in which the curvature varies along its length, the horizontal magnification of the images may be controlled through vertical movement of variable radius cylindrical lens 90. As in the case of the prisms of FIGS. 8A and 8B, cylindrical lens 90 may cause a small angular deviation of the laser beams.

The systems for correcting rotational errors discussed in connection with FIGS. 5–9 work by changing the optical power of the optical pickup to adjust the spacing between the multiple laser beams. In yet another embodiment of the present invention, an optical disk reader may compensate for the magnification error by changing the position of one or more of the optical components in the optical pickup.

Figure 10:
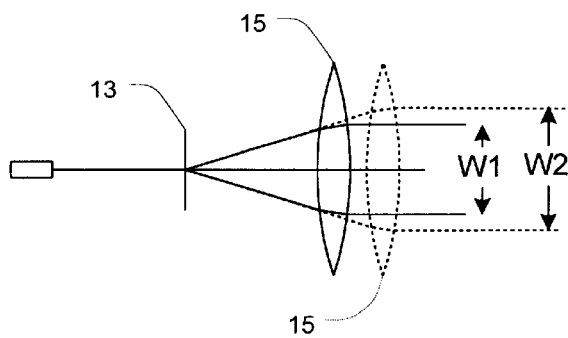

For example, referring back to FIG. 1, the beam from light source 11 is split into multiple diverging beams by grating 13. Collimator lens 15 refracts the multiple laser beams so that they are approximately parallel. Because the beams diverge linearly, the amount of divergence may be changed by changing the separation between diffraction grating 13 and collimator lens 15. Increasing the spacing increases the divergence, and therefore, the spacing between the laser beams. Conversely, reducing the spacing between diffraction grating 13 and collimator lens 15 reduces the spacing between the laser beams, as shown in FIG. 10.

While preferred illustrative embodiments of the present invention are described above, it will be evident to one skilled in the art that various changes and modifications may be made without departing from the invention. It is intended in the appended claims to cover all such changes and modifications which fall within the true spirit and scope of the invention.

What is claimed is:

1. An optical pickup for reading multiple tracks of an optical disk in an optical disk reader having a swing-arm mechanism for positioning the optical pickup, the optical pickup comprising:

a source of multiple laser beams;

a plurality of sensors, each providing an electrical signal responsive to an incident laser beam;

a plurality of optical components arranged to direct the multiple laser beams to the optical disk, forming a pattern of laser beam spots thereon, and to direct multiple laser beams reflected from the disk to the plurality of sensors, wherein an angular orientation of at least one of the plurality of optical components, with respect to the swing-arm, changes responsive to a change in an angular orientation of the swing-arm, so that an angular orientation of the pattern of the laser beam spots on the optical disk remains substantially constant relative to the tracks of the optical disk.

2. The optical pickup of claim 1, wherein the at least one of the plurality of optical components is disposed on the swing-arm such that the at least one optical component pivots about an axis.

3. The optical pickup of claim 2 further comprising circuitry coupled to the plurality of sensors for providing a rotation error signal, wherein the at least one optical component pivots about the axis responsive to the rotation error signal.

4. The optical pickup of claim 2 wherein the axis of rotation of the at least one optical component is spaced apart from a pivot axis of the swing-arm.

5. The optical pickup of claim 2 further comprising circuitry for determining a position of the swing-arm, wherein the at least one optical component pivots responsive to the determined position.

6. The optical pickup of claim 5 wherein the axis of rotation of the at least one optical component is spaced apart from a pivot axis of the swing-arm.

7. The optical pickup of claim 5 wherein the circuitry for determining the position of the swing-arm comprises circuitry for estimating a physical position of the swing-arm responsive to the identity of a track being read.

8. The optical pickup of claim 1, wherein the plurality of optical components includes optical components forming an periscope.

9. An optical drive comprising:

a swing-arm;

a pickup assembly that uses multiple laser beams to simultaneously reads multiple tracks of an optical disk, the optical pickup assembly disposed from the swing-arm, wherein the laser beams form a pattern of laser beam spots on the optical disk; and means for compensating for changes in an angular orientation of the pattern of the laser beam spots, with respect to the multiple tracks of the optical disk, caused by rotation of the swing-arm.

10. The optical drive of claim 9 further comprising a means for providing a rotation error signal, wherein the means for compensating is responsive to the rotation error signal.

11. The optical drive of claim 10 wherein the means for compensating comprises a plurality of optical components.

12. The optical drive of claim 11 wherein the plurality of optical components provides an adjustable magnification level and the means for compensating further comprises means for adjusting the magnification level.

13. The optical drive of claim 11 wherein the means compensating further comprises servo means for altering a position of at least one of the plurality of optical components.

14. The optical drive of claim 11 wherein the at least one optical component is a member of a group consisting of a lens, a mirror, a diffraction grating, a hologram, and a prism.

15. The optical drive of claim 9 wherein the means for providing a rotation error signal comprises:

a sensor; and circuitry for providing the rotation error signal responsive to an output of the sensor.

16. A method for reading multiple data tracks from an optical disk, the method comprising:

providing a plurality of sensors, each sensor providing an output signal responsive to an amount of illumination incident thereon;

providing a plurality of laser beams, each laser beam being reflected from a corresponding one of the multiple data tracks such that each reflected laser beam is modulated by data recorded in the corresponding track;

directing the multiple modulated laser beams onto corresponding ones of the plurality of sensors;

generating a rotation error signal responsive to the sensor output signals indicating the presence of a rotational error in the angular orientation of the plurality of laser beams with respect to the multiple data tracks; and compensating for the rotational error responsive to the rotation error signal.

17. The method of claim 16 wherein directing the multiple modulated laser beams comprises providing a plurality of optical components arranged to direct the modulated laser beams onto the plurality of sensors.

18. The method of claim 17 wherein generating a rotational error signal comprises combining the output signals of at least two of the sensors.

19. The method of claim 17 wherein generating a rotational error signal comprises generating an rotational error signal responsive to a radial position of a portion of the optical disk being read.

20. The method of claim 17 wherein compensating for the rotational error comprises altering a position or orientation of at least one of the plurality of optical components responsive to the rotation error signal.

21. The method of claim 20 wherein the at least one of the plurality of optical components is mounted on a rotatable support, and wherein altering a position or orientation of the at least one of the plurality of optical components comprises rotating the rotatable support.

22. The method of claim 21 wherein compensating for the rotational error comprises changing a spacing between at least two of the plurality optical components.

* * * * *